(12) United States Patent
Kawashima

(10) Patent No.: US 9,509,879 B2
(45) Date of Patent: Nov. 29, 2016

(54) IMAGE PROCESSING APPARATUS, METHOD FOR CONTROLLING IMAGE PROCESSING APPARATUS, AND STORAGE MEDIUM

(71) Applicant: CANON KABUSHIKI KAISHA, Tokyo (JP)

(72) Inventor: Yasuaki Kawashima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/896,214

(22) Filed: May 16, 2013

(65) Prior Publication Data

US 2013/0308154 A1 Nov. 21, 2013

(30) Foreign Application Priority Data

May 21, 2012 (JP) .................. 2012-115757

(51) Int. Cl.
| | |
|---|---|
| G06F 15/00 | (2006.01) |
| H04N 1/00 | (2006.01) |
| G06F 21/60 | (2013.01) |
| H04N 1/44 | (2006.01) |
| H04N 1/32 | (2006.01) |
| H04L 29/06 | (2006.01) |

(52) U.S. Cl.
CPC ........ *H04N 1/00856* (2013.01); *G06F 21/608* (2013.01); *H04N 1/00925* (2013.01); *H04N 1/32053* (2013.01); *H04N 1/4413* (2013.01); *H04N 1/4433* (2013.01); *H04L 63/083* (2013.01); *H04N 1/00408* (2013.01); *H04N 1/00474* (2013.01); *H04N 1/00482* (2013.01); *H04N 2201/0094* (2013.01)

(58) Field of Classification Search
CPC ................... G06F 21/608; H04N 2201/0094; H04L 63/083
USPC ........................................ 358/1.14
See application file for complete search history.

(56) References Cited

U.S. PATENT DOCUMENTS

| | | | | |
|---|---|---|---|---|
| 2006/0050303 | A1* | 3/2006 | Oomori | H04N 1/32048 358/1.15 |
| 2006/0050307 | A1* | 3/2006 | Koike | 358/1.15 |
| 2006/0268323 | A1 | 11/2006 | Hashimoto | |
| 2007/0136376 | A1* | 6/2007 | Kusakabe | G06F 19/3456 |
| 2009/0174890 | A1* | 7/2009 | Shigehisa et al. | 358/1.14 |
| 2010/0014110 | A1* | 1/2010 | Munetomo | 358/1.14 |
| 2010/0231950 | A1 | 9/2010 | Sawayanagi | |
| 2010/0321717 | A1 | 12/2010 | Ohba | |
| 2011/0032563 | A1* | 2/2011 | Matsuzawa | H04N 1/00222 358/1.15 |
| 2011/0188073 | A1* | 8/2011 | Akutsu | 358/1.15 |
| 2012/0105900 | A1 | 5/2012 | Tsuzuki | |

FOREIGN PATENT DOCUMENTS

| | | |
|---|---|---|
| CN | 1893507 A | 1/2007 |
| EP | 588083 A2 | 3/1994 |
| JP | 2011-234126 A | 11/2011 |

* cited by examiner

*Primary Examiner* — Saeid Ebrahimi Dehkord
(74) *Attorney, Agent, or Firm* — Canon USA Inc., IP Division

(57) ABSTRACT

A multi-function peripheral (MFP) receives authentication information and permits use of the MFP when authentication of a user based on the authentication information succeeds. The MFP inhibits timer transmission setting of image data when a password included in the authentication information is used continuously for transmitting the image data.

17 Claims, 21 Drawing Sheets

FIG.7

```
┌─────────────────────────────────────────────┐
│ DESTINATION INPUT                           │
├─────────────────────────────────────────────┤
│                                             │
│ ■ FOLDER HOST NAME                          │
│   ┌───────────────────────────────┐         │
│   │                               │~701     │
│   └───────────────────────────────┘         │
│                                             │
│ ■ FOLDER PATH                               │
│   ┌───────────────────────────────┐         │
│   │                               │~702     │
│   └───────────────────────────────┘         │
│                                             │
│ ■ USER NAME                                 │
│   ┌───────────────────────────────┐         │
│   │                               │~703     │
│   └───────────────────────────────┘         │
│                                             │
│ ■ PASSWORD                                  │
│   ┌───────────────────────────────┐         │
│   │                               │~704     │
│   └───────────────────────────────┘         │
│                                             │
└─────────────────────────────────────────────┘
```

FIG.8

ADDRESS BOOK REGISTRATION

■ FOLDER HOST NAME

| server.abc.co.jp | ~801 |

■ FOLDER PATH

| /home/common | ~802 |

■ USER NAME

| user | ~803 |

■ PASSWORD

| password | ~804 |

■ CONFIRM FOR EACH TRANSMISSION

| ON |

| USER SETTING (A1001) |
|---|
| USER NAME  [ user1 ] ~1001 |
| PASSWORD  [ password1 ] ~1002 |

FIG.14

DESTINATION CONFIRMATION

■ FOLDER HOST NAME

| server.abc.co.jp | ~1401

■ FOLDER PATH

| /home/common | ~1402

■ USER NAME

~1403

■ PASSWORD

NEW TRANSFER SETTING REGISTRATION

- RECEIVING METHOD  [ FACSIMILE ▼ ]—1801

- RECEIVING CONDITION  [ TRANSMISSION SOURCE NUMBER IS 03-1234-5678 ]
                                                              1802

- TRANSFER DESTINATION  [            ]—1803

FIG.19

TRANSFER DESTINATION INPUT

■ FOLDER HOST NAME

[           ]~1901

■ FOLDER PATH

[           ]~1902

■ USER NAME

[           ]~1903

■ PASSWORD

[           ]~1904

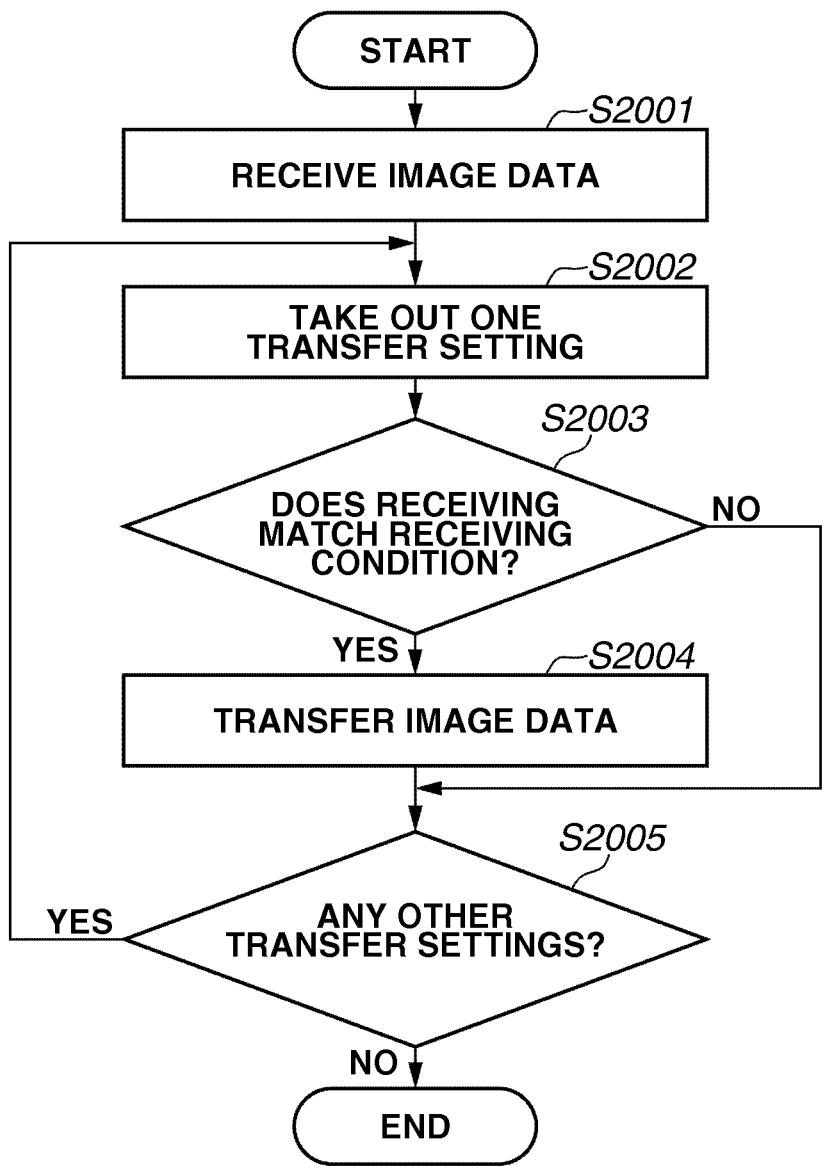

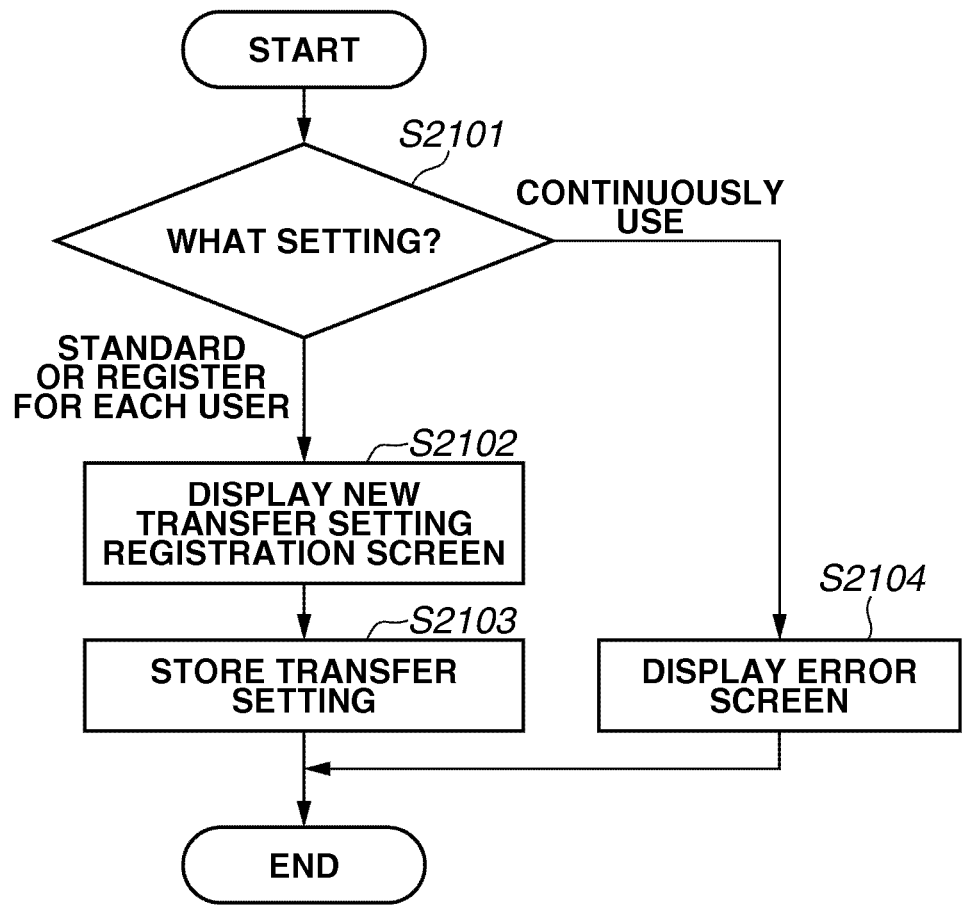

IMAGE PROCESSING APPARATUS, METHOD FOR CONTROLLING IMAGE PROCESSING APPARATUS, AND STORAGE MEDIUM

BACKGROUND

Field

Aspects of the present invention generally relate to an image processing apparatus, which sends image data, and a method for controlling the image processing apparatus, and a storage medium.

Description of the Related Art

Image data has conventionally been known to be sent by file transmission from an image processing apparatus such as a multi-function peripheral (MFP). Image data has been known to be sent using a server message block (SMB), for example, as a transmission protocol for file transmission (Japanese Patent Application Laid-Open No. 2011-234126).

Another example of the transmission protocol for file transmission is a distributed authoring and versioning protocol for the WWW (WebDAV). Still another example is a file transfer protocol (FTP).

If file transmission is performed using these methods, authentication information (a user name and a password) for accessing a destination apparatus is required in addition to information (a host name) representing an apparatus, which manages a folder serving as a storage destination of image data, and positional information (a path) about the folder.

The destination apparatus to which the image data is to be sent by file transmission is in the same domain as the image processing apparatus serving as a transmission source, authentication information about a user may be integrally managed. In this case, authentication information used to login to the image processing apparatus and authentication information required to access the destination apparatus in file transmission may be common.

If the authentication information are common, the authentication information input by the user to login to the image processing apparatus is used continuously (diverted) as authentication information for sending the image data by file transmission so that time and labor required for the user to individually input the authentication information can be reduced.

On the other hand, timer transmission has been known for image data transmission. "Timer transmission" is a function of waiting without sending image data until a designated time after an instruction to send the image data is issued from a user and automatically sending the image data at the designated time. If the timer transmission is used, the user has already logged out of the image processing apparatus generally when the image data is sent.

Therefore, when an attempt to use the above-mentioned authentication information continuously, as described above, is made in using timer transmission, authentication information input to login to the image processing apparatus continues to also be retained in the image processing apparatus after the user logs out of the image processing apparatus. However, it is not desirable, from the aspect of security, to continue to retain the authentication information about the user after the logout, because a risk for leakage of the authentication information is increased.

Reception-transfer has also been known for image data transmission. "Reception-transfer" is a function of a user previously registering a condition for transferring received image data and automatically transferring, when image data that matches the condition, the image data. In this case, the user also generally logs out of the image processing apparatus when the image data is transferred. Therefore, there is a problem of security, like that described above for timer transmission.

SUMMARY

An aspect of the present invention is generally related to a mechanism for inhibiting timer transmission setting or reception-transfer setting when a password used to login to an apparatus is used continuously.

One aspect of the present invention, an image processing apparatus includes a receiving unit configured to receive input of authentication information, a permitting unit configured to permit use of the image processing apparatus when authentication of a user based on the authentication information succeeds, and a control unit configured to inhibit timer transmission setting of image data when a password included in the authentication information is used continuously for sending the image data.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 illustrates an operation screen of the MFP in the exemplary embodiment.

FIG. 8 illustrates an operation screen of the MFP in the exemplary embodiment.

FIG. 10 illustrates an operation screen of the MFP in the exemplary embodiment.

FIG. 14 illustrates an operation screen of the MFP in the exemplary embodiment.

FIG. 18 illustrates an operation screen of an MFP in a third exemplary embodiment.

FIG. 19 illustrates an operation screen of the MFP in the exemplary embodiment.

FIG. 20 is a flowchart illustrating a reception-transfer operation of the MFP in the exemplary.

FIG. 21 is a flowchart illustrating an operation for inhibiting reception-transfer setting of the MFP in the exemplary embodiment.

DESCRIPTION OF THE EMBODIMENTS

Various exemplary embodiments, features, and aspects of the invention will be described in detail below with reference to the drawings.

It is to be understood that exemplary embodiments, described below, do not limit the invention according to the scope of claims, and all combinations of features described in the exemplary embodiments are not essential for a solution to the issue of the present invention.

Figure 1:
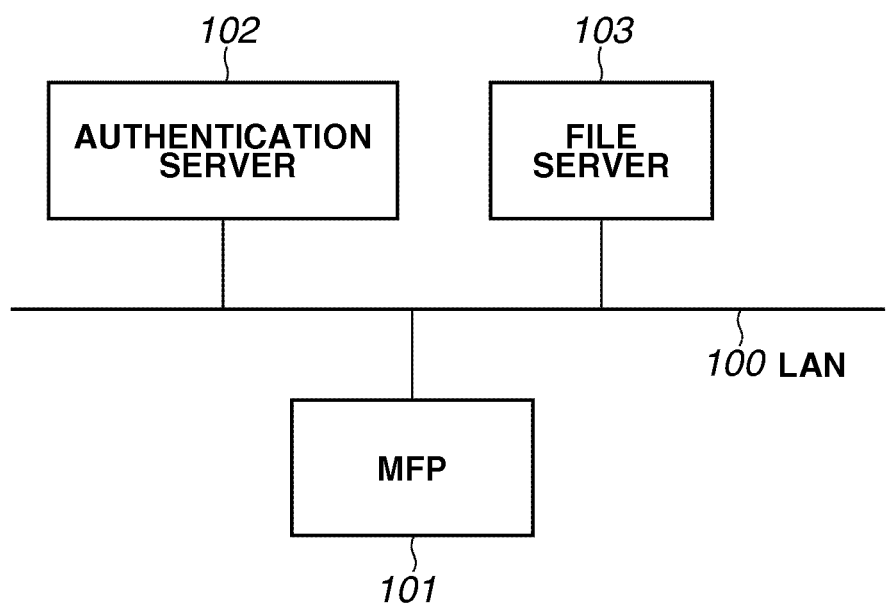
FIG. 1 is an entire image processing system according to a first exemplary embodiment.

A first exemplary embodiment will now be described. FIG. 1 is an entire image processing system.

An MFP 101, an authentication server 102, and a file server 103 are connected to be capable of communicating with one another on a local area network (LAN) 100. The MFP 101 is an example of an image processing apparatus. The authentication server 102 is an example of an authentication apparatus. The file server 103 is an example of a file management apparatus.

The MFP 101 can perform file transmission using a folder in the file server 103 as a destination. The MFP 101 can send image data by an electronic mail (e-mail) via a mail server (not illustrated). The MFP 101 is connected to a public telephone line network via a modem (not illustrated), and can send/receive image data by facsimile communication.

While the image processing system includes the MFP 101, the authentication server 102, and the file server 103, only the MFP 101 and the authentication server 102 or only the MFP 101 can also be referred to as an image processing system.

Figure 2:
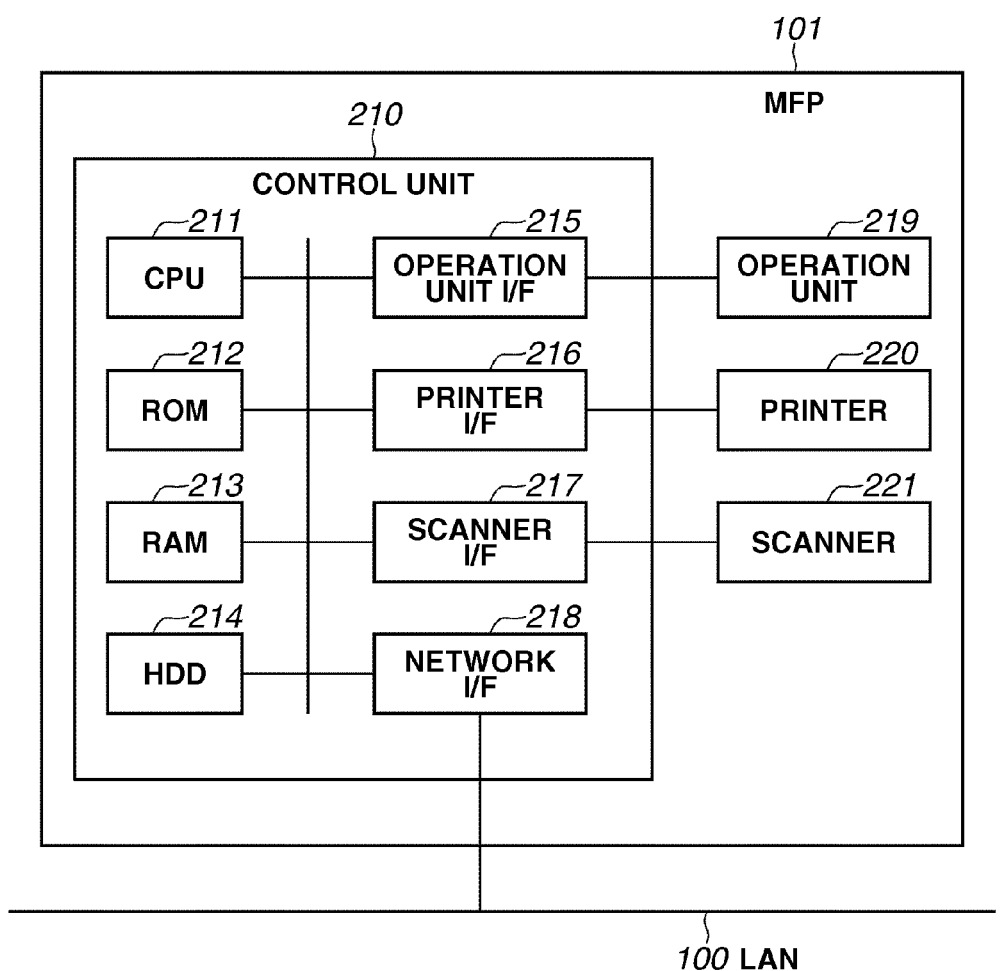
FIG. 2 is a block diagram illustrating a configuration of an MFP in the exemplary embodiment.

FIG. 2 is a block diagram illustrating a configuration of the MFP 101.

A control unit 210 including a central processing unit (CPU) 211 controls an operation of the entire MFP 101. The CPU 211 reads out a control program stored in a read-only memory (ROM) 212, and performs various types of control such as reading control and transmission control. A random access memory (RAM) 213 is used as a temporary storage area, such as a main memory or a work area, of the CPU 211.

While in the MFP 101, one CPU 211 performs various types of processing illustrated in flowcharts described below by using one memory (the RAM 213 or a hard disk drive (HDD) 214), other manners may be used. For example, a plurality of CPUs and a plurality of RAMs or HDDs can also cooperate with one another to perform various types of processing illustrated in the flowcharts described below.

The HDD 214 stores image data and various types of programs. An operation unit interface (I/F) 215 connects an operation unit 219 and the control unit 210. The operation unit 219 includes a liquid crystal display unit having a touch panel function and a keyboard, and functions as a receiving unit for receiving an instruction from a user and input of various types of information.

A printer I/F 216 connects a printer 220 and the control unit 210. Image data to be printed by the printer 220 is transferred from the control unit 210 via the printer I/F 216, and is printed on a recording medium in the printer 220.

A scanner I/F 217 connects a scanner 221 and the control unit 210. The scanner 221 reads an image on a document to generate image data (an image file), and inputs the generated image data to the control unit 210 via the scanner I/F 217. The MFP 101 can send the image data (image file) generated by the scanner 221 by file transmission or mail transmission.

A network I/F 218 connects the control unit 210 (the MFP 101) to the LAN 100. The network I/F 218 sends image data and information to external apparatuses (the authentication server 102, the file server 103, etc.) on the LAN 100, and receives various types of information from the external apparatuses on the LAN 100.

Figure 3:
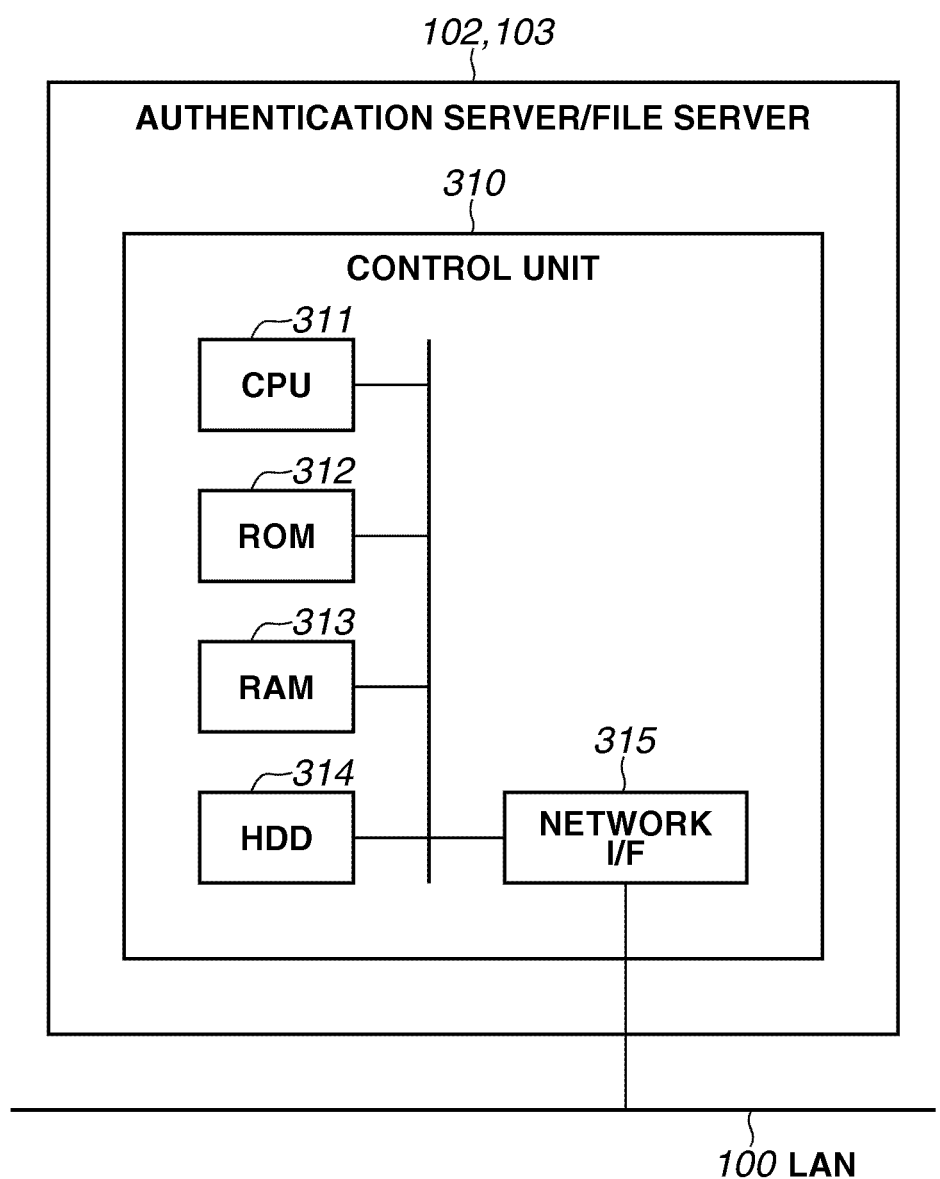
FIG. 3 is a block diagram illustrating a configuration of an authentication server and a file server in the exemplary embodiment.

FIG. 3 is a block diagram illustrating a configuration of the authentication server 102.

A control unit 310 including a CPU 311 controls an operation of the entire authentication server 102. The CPU 311 reads out a control program stored in a ROM 312, and performs various types of control processing. A RAM 313 is used as a temporary storage area, such as a main memory or a work area, of the CPU 311. A HDD 314 stores image data and various types of programs.

A network I/F 315 connects the control unit 310 (the authentication server 102) to the LAN 100. The network I/F 315 sends/receives various types of information to/from other apparatuses on the LAN 100. A configuration of the file server 103 is similar to that of the authentication server 102 (FIG. 3), and hence description thereof is not repeated.

Figure 4:
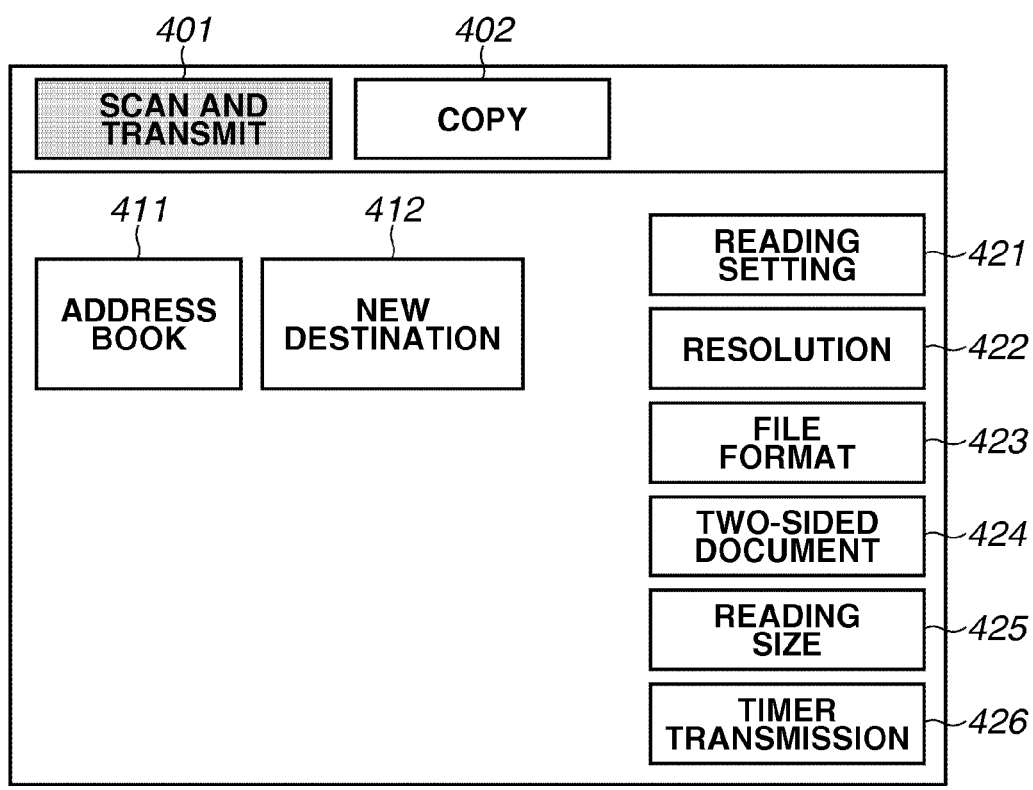
FIG. 4 illustrates an operation screen of the MFP in the exemplary embodiment.

FIG. 4 illustrates an example of an operation screen displayed on the operation unit 219.

The user can select a function by operating operation keys 401 and 402 on the operation screen illustrated in FIG. 4. FIG. 4 illustrates a state where the operation key 401 has been selected. While "scan and transmit" and "copy" are illustrated as the functions in FIG. 4, the MFP 101 may include the other functions.

The user, who has selected the operation key 401, can set a destination of image data to be sent by operating operation keys 411 and 412. When the operation key 411 is operated, a content of the address book retained in the HDD 214 is displayed so that the user can refer to the content registered in the address book and designate the destination of the image data.

When the operation key 412 is operated, a screen, which receives input of new destination information from the user, is displayed. The user can input the destination information via the displayed screen and designate the destination of the image data.

An operation key for displaying a list of one-touch keys may be provided, although not illustrated. One or a plurality of destinations has been previously corresponded to each of the one-touch keys. The user can designate a content, which corresponds to the desired one of the one-touch keys, as the destination of the image data by operating the one-touch key.

An operation key 421 is used when reading setting such as color/monochrome is performed. An operation key 422 is used when a reading resolution is set. An operation key 423 is used when a file format of image data to be sent is set. An operation key 424 is used when one-sided/two-sided reading is set. An operation key 425 is used when a reading size is set.

Figure 5:
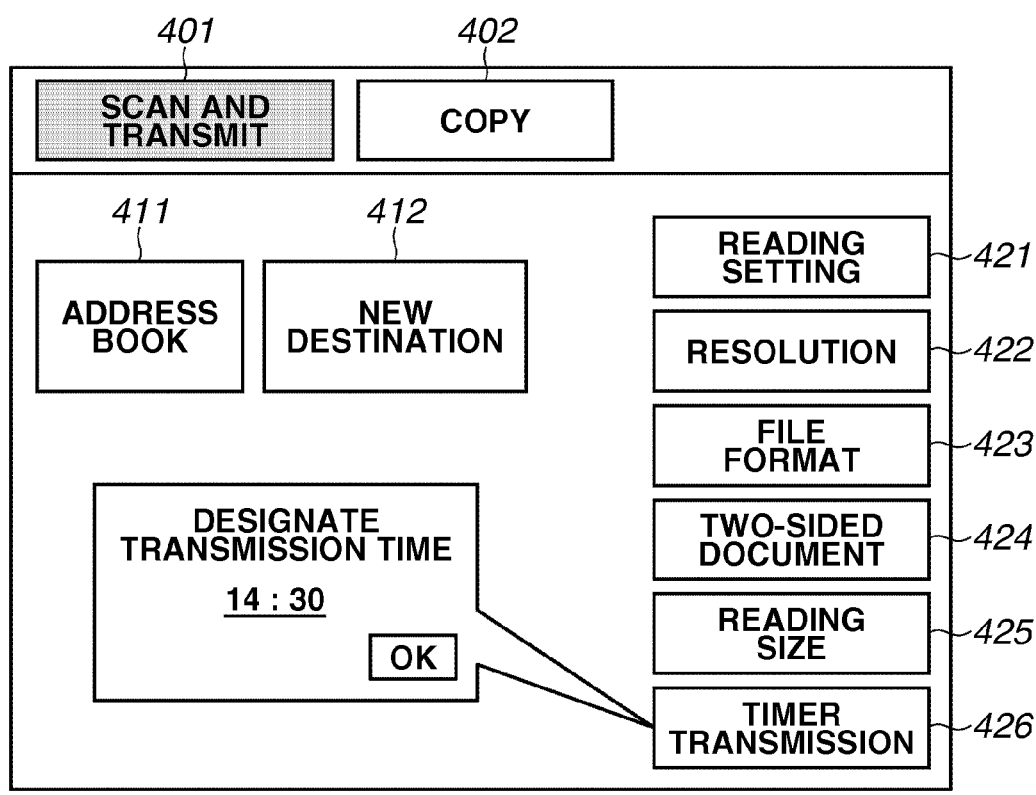
FIG. 5 illustrates an operation screen of the MFP in the exemplary embodiment.

An operation key 426 is used when timer transmission is set. "Timer transmission" is a function of sending, when the user issues an instruction to send image data, the image data not immediately but automatically after waiting until the time designated by the user. When the operation key 426 is operated, a screen changes, as illustrated in FIG. 5. The user can designate the transmission time of the image data via the screen illustrated in FIG. 5.

Figure 6:
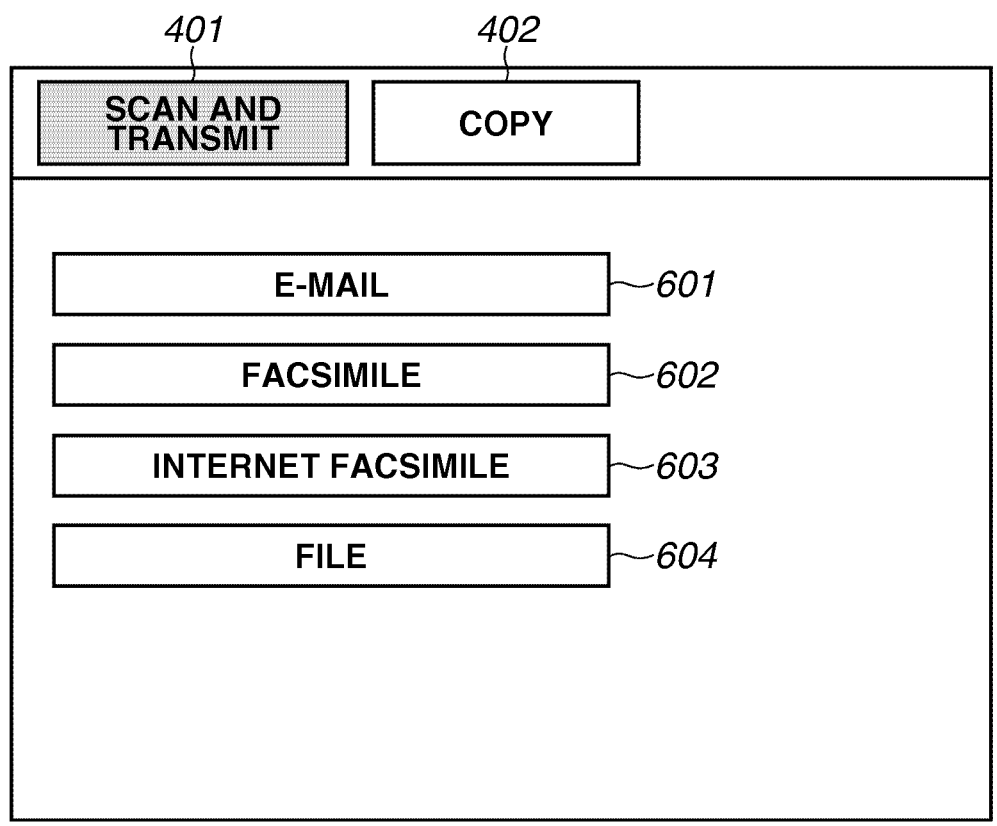
FIG. 6 illustrates an operation screen of the MFP in the exemplary embodiment.

FIG. 6 illustrates an example of an operation screen displayed on the operation unit 219.

The operation screen illustrated in FIG. 6 is displayed when the operation key 412 illustrated in FIG. 4 is operated. The user can select a method for sending image data by operating any one of operation keys 601 to 604.

If the image data is attached to an e-mail when sent, the user operates the operation key 601. If the image data is sent by a facsimile (G3 facsimile), the user operates the operation key 602. If the image data is sent by an Internet facsimile, the user operates the operation key 603. "Internet facsimile" is a method for attaching image data in a facsimile format to an e-mail when sending the image data. If the image data is sent by file transmission, the user operates the operation key 604.

FIG. 7 illustrates an example of an operation screen displayed on the operation unit 219.

The operation screen illustrated in FIG. 7 is displayed when the operation key 604 illustrated in FIG. 6 is operated. Information 701 and 702 are information (a host name and a path) for specifying a folder serving as a destination of image data. Information 703 and 704 are authentication information (a user name and a password) required to access the folder specified by the information 701 and 702.

The user of the MFP 101 can input new destination information for file transmission via the operation screen illustrated in FIG. 7 and designate the input new destination information as a destination of image data. On the other hand, information similar to that input in FIG. 7 can be previously registered in the address book to save time and labor required to newly input destination information for each transmission.

FIG. 8 illustrates an example of an operation screen displayed on the operation unit 219.

The operation screen illustrated in FIG. 8 is displayed when destination information for file transmission is registered in the address book. Information 801 to 804 are similar to the information 701 to 704 as described above. An entry field of information 805 is further provided on the operation screen illustrated in FIG. 8.

The information 805 indicates whether the user is made to confirm authentication information set as the information 803 and 804 for each transmission. When the information 805 has been set to "ON", the user is required to confirm the authentication information when image data is actually sent.

Figure 9:
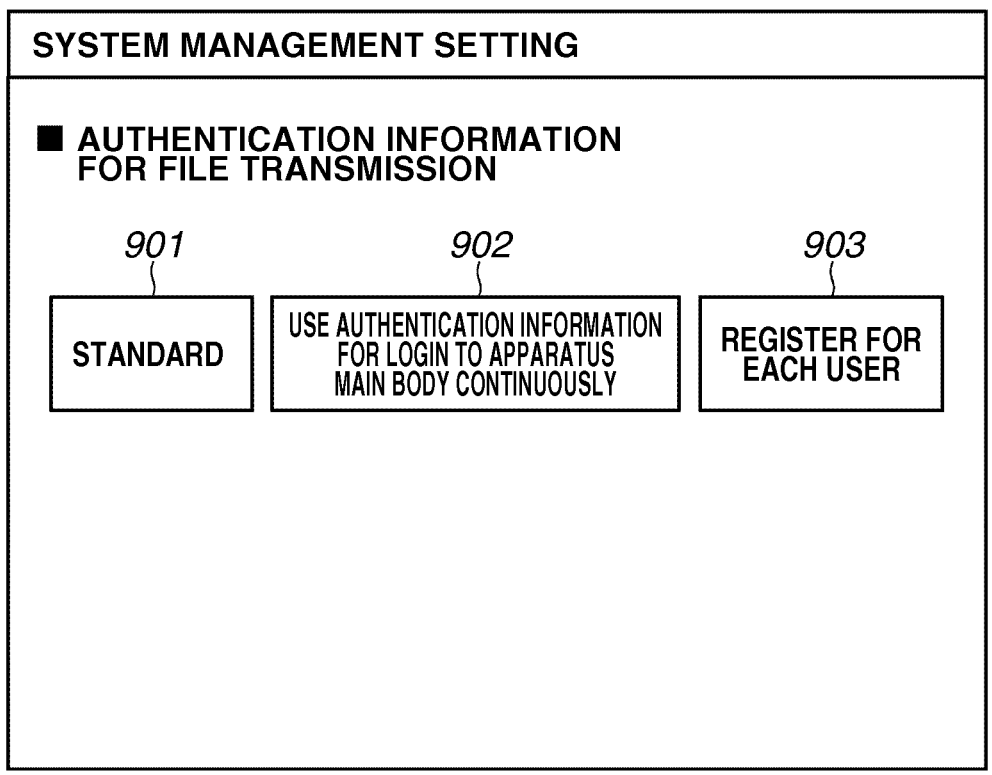
FIG. 9 illustrates an operation screen of the MFP in the exemplary embodiment.

FIG. 9 illustrates an example of an operation screen displayed on the operation unit 219.

The operation screen illustrated in FIG. 9 can be operated only by a manager, and is not displayed when a general user operates the MFP 101. The manager performs a setting about continuous use of authentication information via the operation screen illustrated in FIG. 9.

When the manager operates an operation key 901, the authentication information is not used continuously. When the manager operates an operation key 902, the authentication information is used continuously. "Continuous use of authentication information" is to enable authentication information, which has been input for the user to login to the MFP 101, to be presented to the user as authentication information for file transmission and to be used. When the manager operates the operation key 903, authentication information (described below with reference to FIG. 10) which has previously been registered for each user, is presented as authentication information for file transmission.

FIG. 10 illustrates an example of an operation screen displayed on the operation unit 219.

The operation screen illustrated in FIG. 10 is displayed when a general user operates the MFP 101. The user can register authentication information (a user name and a password) for sending image data by file transmission as information 1001 and 1002. The authentication information thus registered is used when "register for each user" illustrated in FIG. 9 is selected.

FIG. 10 illustrates an example in which the information 1001 and the information 1002 are registered for one user who has been managed by an identifier "A1001". However, the information 1001 and the information 1002 can also be registered similarly for other users. The information 1001 and the information 1002 are stored in the HDD 214.

Figure 11:
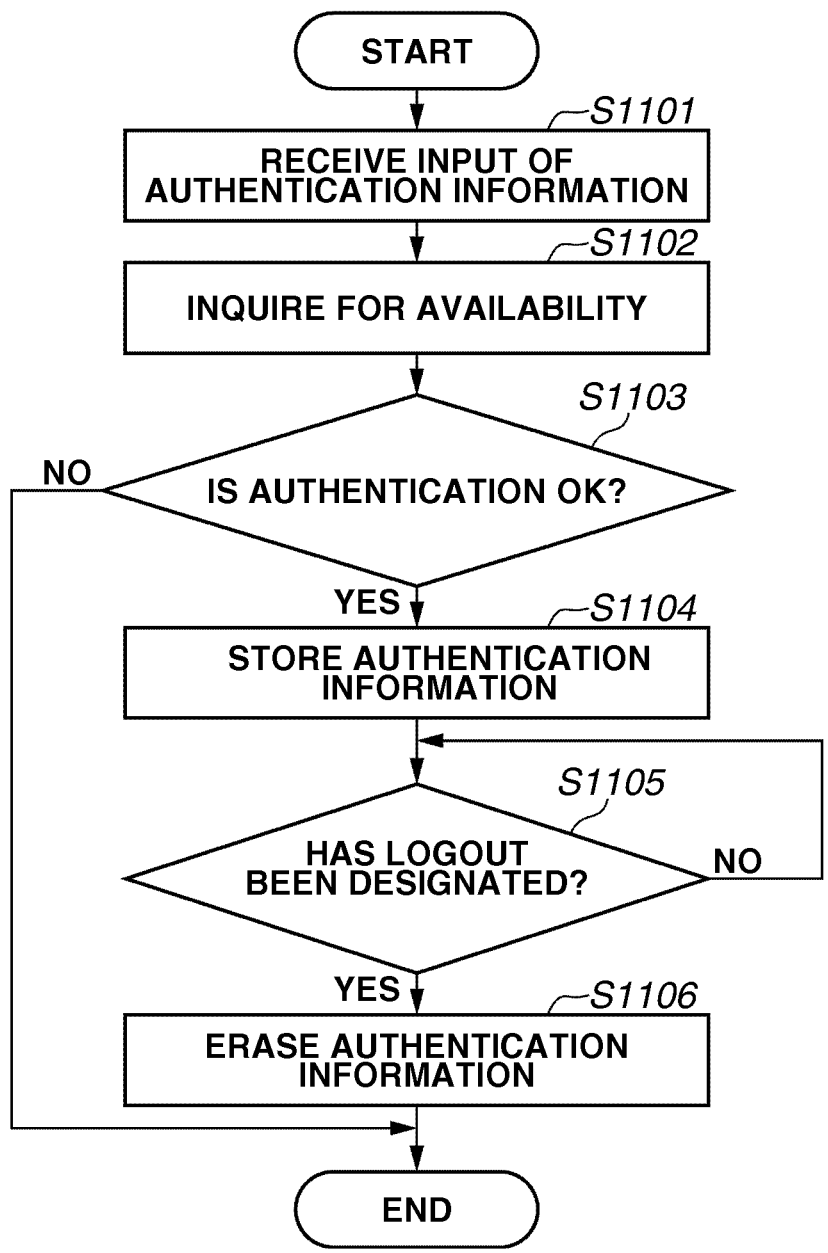
FIG. 11 is a flowchart illustrating a login operation of the MFP in the exemplary embodiment.

FIG. 11 is a flowchart illustrating a login operation in the MFP 101 (a series of operations performed when the user starts to use the MFP 101). Each of operations (steps) illustrated in the flowchart of FIG. 11 is implemented when the CPU 211 in the MFP 101 executes a control program stored in the HDD 214.

In step S1101, the CPU 211 receives input of authentication information (a user name and a password) from the user via a screen displayed on the operation unit 219.

In step S1102, the CPU 211 sends the authentication information, which has been received in step S1101, to the authentication server 102, and requests the authentication server 102 to authenticate the user (inquires for availability of the MFP 101).

In step S1103, the CPU 211 determines whether a content notified from the authentication server 102 is OK or NG. If the authentication is OK (YES in step S1103), the CPU 211 permits the user to use the MFP 101, and the processing proceeds to step S1104. On the other hand, if the authentication is NG (NO in step S1103), the processing ends (or the processing returns to step S1101, and a screen for inputting authentication information is displayed again in step S1101).

In step S1104, the CPU 211 stores the authentication information, which has been received in step S1101, in the RAM 213 or the HDD 214. By the foregoing processing, the user starts to use the MFP 101.

In step S1105, the CPU 211 determines whether a logout instruction has been issued from the user. If the logout instruction has been issued (YES in step S1105), the processing proceeds to step S1106. In step S1106, the CPU 211 erases the authentication information, which has been stored in the RAM 213 or the HDD 214 in step S1104.

Figure 12:
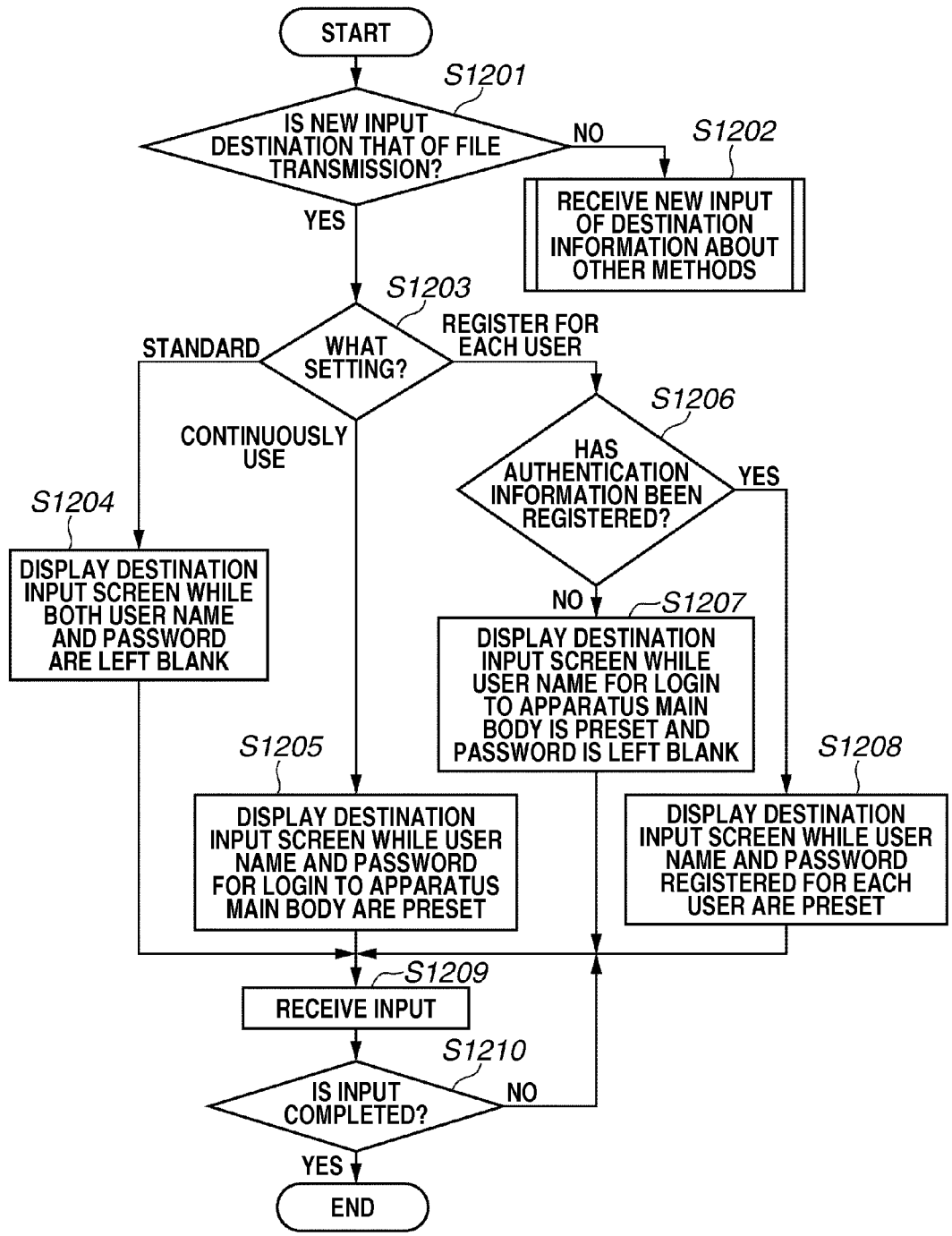
FIG. 12 is a flowchart illustrating a new destination input operation of the MFP in the exemplary embodiment.

FIG. 12 is a flowchart illustrating a new destination input operation in the MFP 101. Each of operations (steps) in the flowchart of FIG. 12 is implemented when the CPU 211 in the MFP 101 executes the control program stored in the HDD 214. The flowchart of FIG. 12 starts when the operation key 412 is operated.

In step S1201, the CPU 211 determines whether a destination to be newly input is that of file transmission. If any of the operation keys 601 to 603 is operated on the operation screen illustrated in FIG. 6, the destination to be newly input is not that of file transmission (NO in step S1201), the processing proceeds to step S1202. In step S1202, the CPU 211 receives input of destination information about an e-mail, a facsimile, or an Internet facsimile.

On the other hand, if the operation key 604 is operated on the operation screen illustrated in FIG. 6, the CPU 211 determines that the destination to be newly input is that of file transmission (YES in step S1201), and the processing proceeds to step S1203. In step S1203, the CPU 211 determines a setting content about continuous use of authentication information.

If the operation key 901 is operated on the operation screen illustrated in FIG. 9, the processing proceeds to step S1204. If the operation key 902 is operated on the operation screen illustrated in FIG. 9, the processing proceeds to step S1205. If the operation key 903 is operated on the operation screen illustrated in FIG. 9, the processing proceeds to step S1206.

In step S1204, the CPU 211 displays the operation screen illustrated in FIG. 7 while the information 703 and 704 are left blank without using authentication information continuously.

In step S1205, the CPU 211 uses the authentication information continuously. More specifically, the operation screen illustrated in FIG. 7 is displayed while the authentication information received in step S1101 (the authentication information stored in step S1104) is read out, and is preset as the information 703 and 704. The authentication information, which has been input by the user to login to the MFP 101, is preset on the operation screen illustrated in FIG. 7 so that time and labor required for the user to input the same authentication information many times can be saved.

In step S1206, the CPU 211 determines whether the authentication information has been registered to match the user who is currently operating the MFP 101. More specifically, the CPU 211 determines whether the information 1001 and the information 1002 illustrated in FIG. 10 are registered.

If the authentication information has been registered (YES in step S1206), the processing proceeds to step S1208. In step S1208, the CPU 211 displays the operation screen illustrated in FIG. 7 while the user name and the password, which are registered via the operation screen illustrated in FIG. 10, are respectively preset as the information 703 and 704.

On the other hand, if the authentication information has not been registered (NO in step S1206), the processing proceeds to step S1207. In step S1207, the CPU 211 displays the operation screen illustrated in FIG. 7 while the user name in the authentication information received in step S1101 (the authentication information stored in step S1104) is read out, and is present as the information 703. At this time, the information 704 is left black. At this time, the information 703 may also be left blank.

If the CPU 211 displays the operation screen illustrated in FIG. 7 in steps S1204, S1205, S1207, and S1208, the information 701 and the information 702 are left blank in any case. In step S1209, the CPU 211 receives input from the user of the information 701 to 704 or change of the preset content.

In step S1210, the CPU 211 determines whether input of a new destination is completed. If the user has issued a completion instruction (YES in step S1210), the processing ends (or the CPU 211 continuously receives designation of other destinations). If the user has not issued the completion instruction (NO in step S1210), the processing returns to step S1209.

Figure 13:
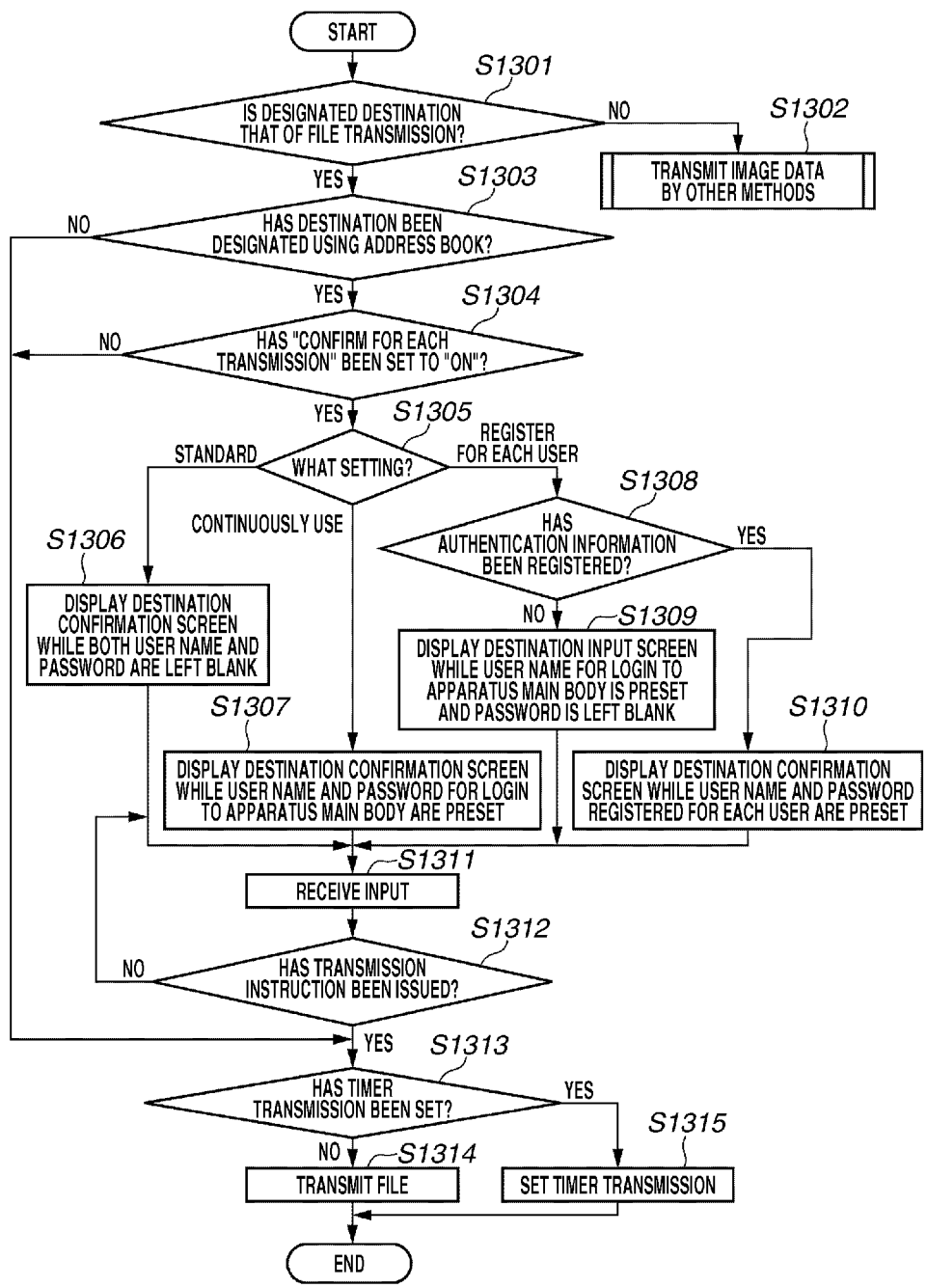
FIG. 13 is a flowchart illustrating a file transmission operation of the MFP in the exemplary embodiment.

FIG. 13 is a flowchart illustrating a file transmission operation in the MFP 101. The file transmission operation starts when a start key (not illustrated) is operated after a destination of image data is designated. Each of operations (steps) illustrated in the flowchart of FIG. 13 is implemented when the CPU 211 in the MFP 101 executes the control program stored in the HDD 214.

In step S1301, the CPU 211 determines whether the designated destination is that of file transmission. If the designated destination is not that of file transmission (NO in S1301), the processing proceeds to step S1302. In step S1302, the CPU 211 sends the image data by an e-mail, a facsimile, or an Internet facsimile. If the designated destination is that of file transmission (YES in step S1301), the processing proceeds to step S1303.

In step S1303, the CPU 211 determines whether the designated destination is designated using the address book or is newly input. If the designated destination is designated using the address book, the processing proceeds to step S1304. If the designated destination is newly input, the processing proceeds to step S1313.

In step S1304, the CPU 211 determines whether the user is made to confirm authentication information for each transmission (which has been described as the information 805 illustrated in FIG. 8). If it is determined that the user is made to confirm the authentication information for each transmission (YES in step S1304), the processing proceeds to step S1305. Otherwise (NO in step S1304), the processing proceeds to step S1313.

In step S1305, the CPU 211 determines a setting content about continuous use of authentication information. If the operation key 901 is operated on the operation screen illustrated in FIG. 9, the processing proceeds to step S1306. If the operation key 902 is operated on the operation screen illustrated in FIG. 9, the processing proceeds to step S1307. If the operation key 903 is operated on the operation screen illustrated in FIG. 9, the processing proceeds to step S1308.

In step S1306, the CPU 211 displays an operation screen illustrated in FIG. 14. The screen illustrated in FIG. 14 is a screen for making the user to confirm a content of the authentication information at the time of transmission.

In step S1306, the authentication information, which has been registered as the information 803 and 804 in the address book, is deleted. Information 1403 and information 1404 illustrated in FIG. 14 are displayed while being left blank. In this case, the user needs to input the information 1403 and 1404.

In step S1307, the CPU 211 uses the authentication information continuously. More specifically, the authentication information, which has been registered as the information 803 and 804 in the address book, is deleted. The operation screen illustrated in FIG. 14 is displayed while the authentication information received in step S1101 (the authentication information stored in step S1104) is read out, and is preset as the information 1403 and 1404.

The authentication information, which has been input by the user to login to the MFP 101, is preset on the operation screen illustrated in FIG. 14 so that time and labor required for the user to input the same authentication information many times can be saved.

In step S1308, the CPU 211 determines whether the authentication information has been registered to match the user who is currently operating the MFP 101. More specifically, the CPU 211 determines whether the information 1001 and the information 1002 illustrated in FIG. 10 are registered.

If the authentication information has been registered (YES in step S1308), the processing proceeds to step S1310. In step S1310, the CPU 211 displays the operation screen illustrated in FIG. 14 while the authentication information, which has been registered as the information 803 and 804 in the address book, is deleted. Further, the user name and the password, which are registered via the operation screen illustrated in FIG. 10, are respectively preset as the information 1403 and 1404.

On the other hand, if the authentication information has not been registered (NO in step S1308), the processing proceeds to step S1309. In step S1309, the CPU 211 displays the operation screen illustrated in FIG. 14 while the authentication information, which has been registered as the information 803 and 804, is deleted. Further, the user name in the authentication information received in step S1101 (the authentication information stored in step S1104) is preset as the information 1403. At this time, the information 1404 is left blank, or the information 1403 may also be left blank as well as the information 1404.

When the operation screen illustrated in FIG. 14 is displayed in steps S1306, S1307, S1309, and S1310, the authentication information, which has been registered as the information 801 and 802 in the address book, is preset as information 1401 and 1402.

In step S1311, the CPU 211 receives input from the user of the information 1403 and 1404 or change of a preset content. In step S1312, the CPU 211 then determines whether a transmission instruction has been issued from the user. If the transmission instruction has been issued (YES in step S1312), the processing proceeds to step 1313. If the transmission instruction has not been issued (NO in step S1312), the processing returns to step S1311.

In step S1313, the CPU 211 determines whether timer transmission using the operation key 426 has been set. If the timer transmission has been set (YES in step S1313), the processing proceeds to step S1315. If the timer transmission has not been set (NO in step S1313), the processing proceeds to step S1314.

In step S1314, the CPU 211 sends the image data by file transmission. More specifically, the MFP 101 is connected to the file server 103 corresponding to a host name indicated by the information 1401 illustrated in FIG. 14, to specify a folder serving as a storage destination of the image data using a path indicated by the information 1402 illustrated in FIG. 14.

The authentication information set as the information 1403 and 1404 illustrated in FIG. 14 is used to login to the file server (accesses the folder), to send the image data to the file server 103 (store the image data in the folder).

If it is not determined in step S1304 that the user is made to confirm authentication information for each transmission, and the processing proceeds to step S1313, the authentication information set as the information 803 and 804 illustrated in FIG. 8 is used to login to the file server (access the folder).

In step S1315, the CPU 211 sets timer transmission so that the image data is to be sent at the time designated by the user (in this stage, the image data is not sent).

Figure 15:
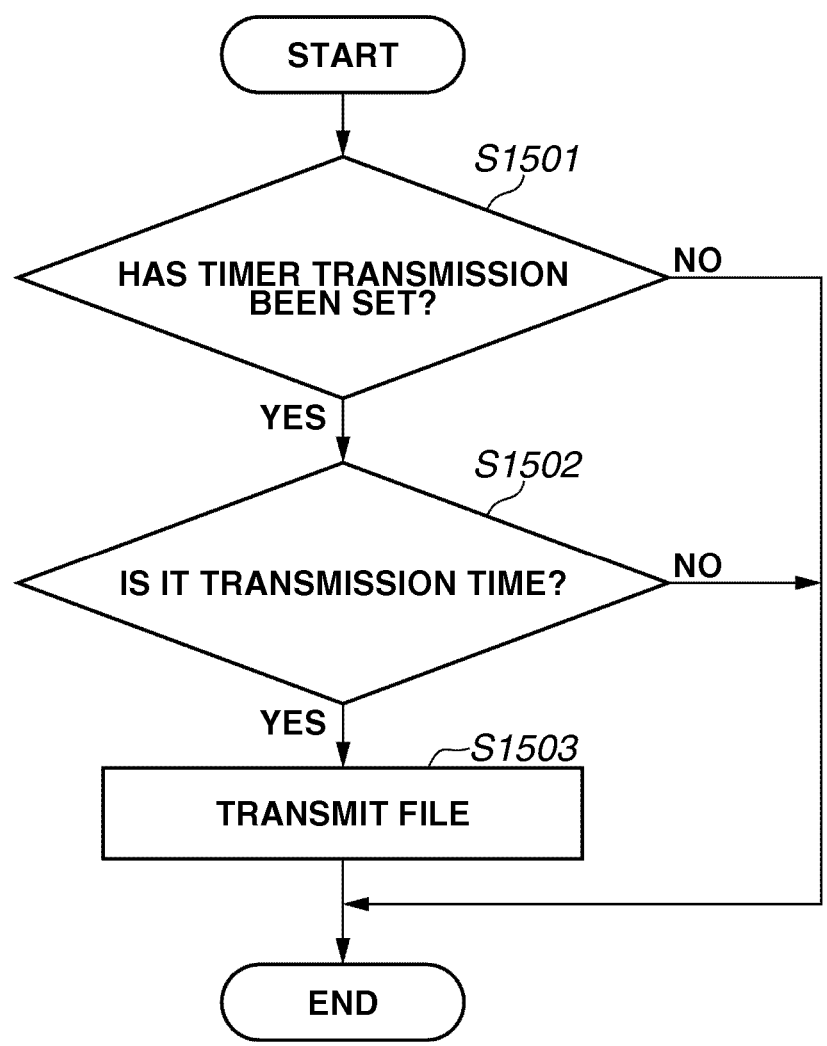
FIG. 15 is a flowchart illustrating a timer transmission operation of the MFP in the exemplary embodiment.

FIG. 15 is a flowchart illustrating a timer transmission operation in the MFP 101. The timer transmission operation starts periodically and automatically in the MFP 101. Each of operations (steps) described in the flowchart of FIG. 15 is implemented when the CPU 211 executes the control program stored in the HDD 214.

In step S1501, the CPU 211 determines the presence or absence of image data whose timer transmission has been set. If there is image data whose timer transmission has been set (YES in step S1501), the processing proceeds to step S1502. If there is no image data whose timer transmission has been set (NO in step S1501), the processing ends.

In step S1502, the CPU 211 determines whether it is the transmission time of the image data whose timer transmission has been set. If it is the transmission time of the image data whose timer transmission has been set (YES in step S1502), the processing proceeds to step S1503. If it is not the transmission time of the image data whose timer transmission has been set (NO in step S1502), the processing ends. In step S1503, the CPU 211 sends the image data by file transmission, like in step S1314 illustrated in FIG. 13.

Figure 16:
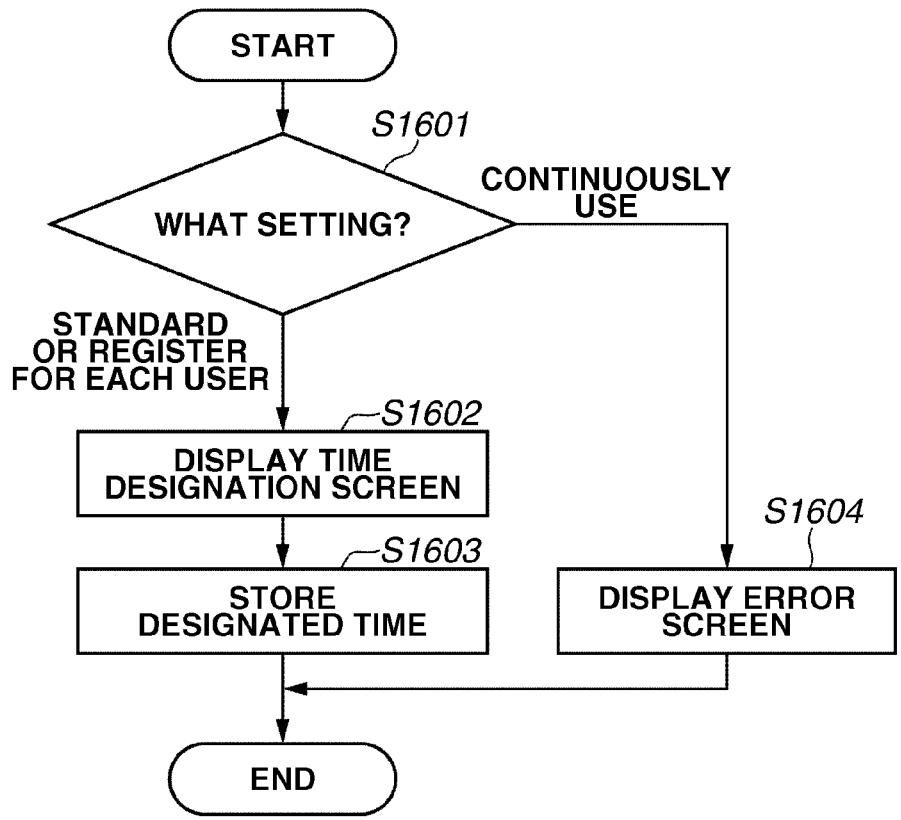
FIG. 16 is a flowchart illustrating an operation for inhibiting timer transmission setting of the MFP in the exemplary embodiment.

FIG. 16 is a flowchart illustrating an operation for inhibiting timer transmission setting in the MFP 101. The timer transmission setting starts when the operation key 426 illustrated in FIG. 4 is operated. Each of operations (steps) illustrated in the flowchart of FIG. 16 is implemented when the CPU 211 in the MFP 101 executes the control program stored in the HDD 214.

In step S1601, the CPU 211 determines a setting content about continuous use of authentication information. If the operation key 901 or 903 is operated on the operation screen illustrated in FIG. 9 (i.e., "standard" or "register for each user" is selected), the processing proceeds to step S1602. In step S1602, the CPU 211 displays the operation screen illustrated in FIG. 5, and receives input of the time designated by the user. In step S1603, the CPU 211 stores the time designated by the user in the ROM 212 or the HDD 214.

On the other hand, if the operation key 902 is operated on the operation screen illustrated in FIG. 9 (i.e., "use authentication information for login to apparatus main body continuously" is selected) as a result of the determination in step S1601, the processing proceeds to step S1604. In step S1604, the CPU 211 displays an error screen including a message indicating that timer transmission setting is inhibited.

While an example in which the setting content about continuous use of the authentication information is determined after the operation key 426 is operated and the error screen is displayed has been described above, another manner may be used. The determination may be performed before the operation key 426 is operated, for example, to inhibit the timer transmission setting by not displaying the operation key 426 (or displaying the operation key 426 in an inoperable state) when "use authentication information for login to apparatus main body continuously" is selected.

In the first exemplary embodiment, an example in which the timer transmission setting is inhibited when the operation key 426 is operated on the screen illustrated in FIG. 4 has been described. On the other hand, in a second exemplary embodiment, an example in which timer transmission setting is received once via the screens illustrated in FIGS. 4 and 5 and is then inhibited when a start key is operated will be described. Similar components to those in the first exemplary embodiment are assigned common reference numerals.

Figure 17:
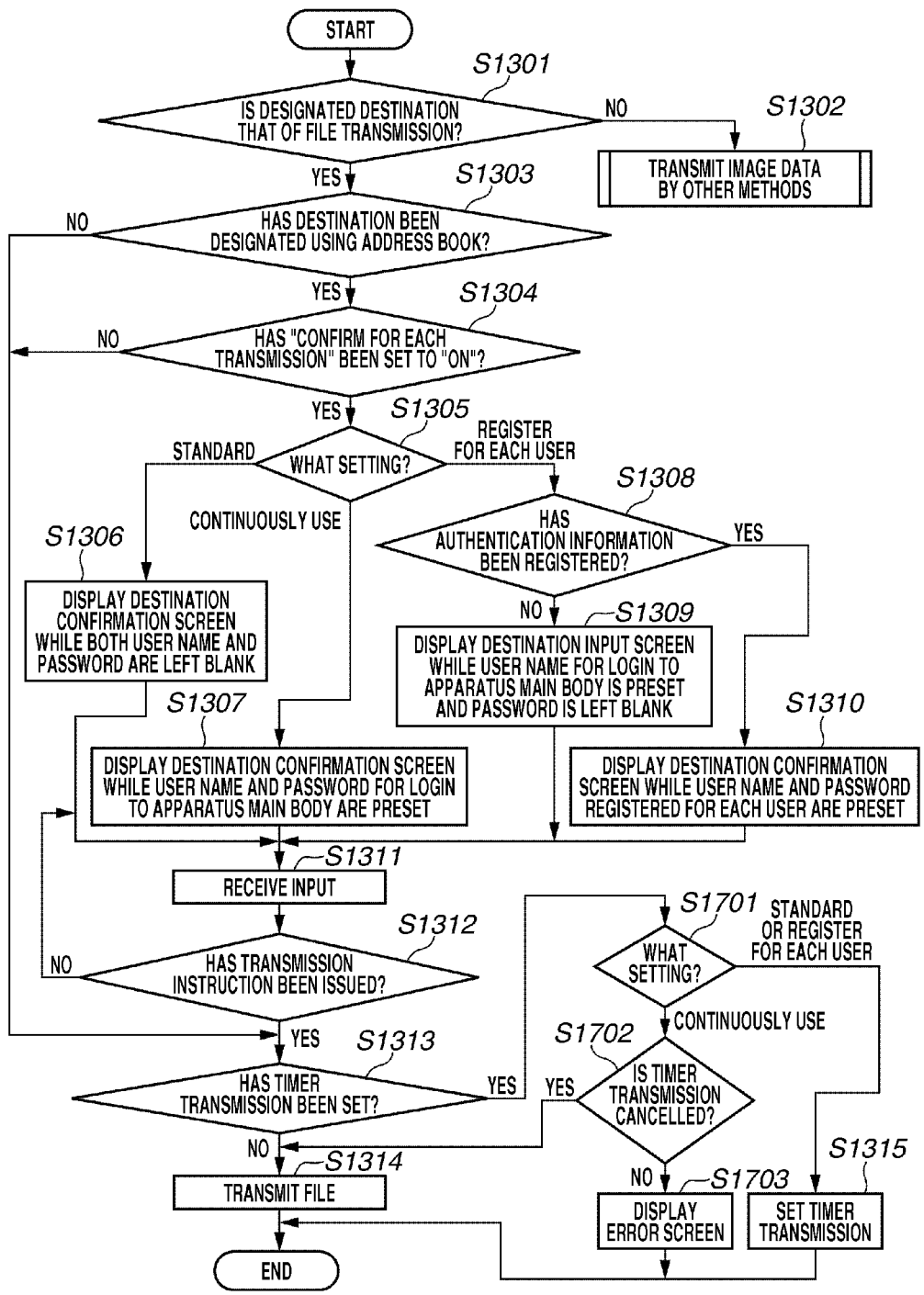
FIG. 17 is a flowchart illustrating a file transmission operation of an MFP in a second exemplary embodiment.

FIG. 17 is a flowchart illustrating a file transmission operation in an MFP 101. The file transmission operation starts when a destination of image data is designated, and a start key (not illustrated) is then operated. Each of operations (steps) illustrated in the flowchart of FIG. 17 is implemented when a CPU 211 in the MFP 101 executes a control program stored in a HDD 214.

When the flowchart of FIG. 17 is compared with the flowchart of FIG. 13, steps S1701 to S1703 are added.

If timer transmission has been set as a result of the determination in step S1313, the processing proceeds to step S1701. In step S1701, the CPU 211 determines a setting content about continuous use of authentication information. If the operation key 901 or 903 is operated on the operation screen illustrated in FIG. 9 (i.e., "standard" or "register for each user" is selected), the processing proceeds to step S1315. In step S1315, the CPU 211 sets the timer transmission so that the image data is to be sent at the time designated by the user (in this stage, the image data is not sent).

On the other hand, if the operation key 902 is operated on the operation screen illustrated in FIG. 9 (i.e., "use authentication information for login to apparatus main body continuously" is selected) as a result of the determination in step S1701, the processing proceeds to step S1702. In step S1702, the CPU 211 determines whether timer transmission setting is canceled.

The CPU 211 displays a screen for the user to issue an instruction as to whether the timer transmission setting is to be canceled, and inquires the user whether the timer transmission setting is to be canceled. If the user issues an instruction to cancel the timer transmission setting (YES in step S1702), the processing proceeds to step S1314. In step S1314, the CPU 211 sends the image data by file transmission. On the other hand, if the user does not issue the instruction to cancel the timer transmission setting (NO in step S1702), the processing proceeds to step S1703. In step S1703, the CPU 211 displays an error screen including a message indicating that the timer transmission setting is inhibited.

In the first and second exemplary embodiments, an example in which the timer transmission setting is inhibited has been described. On the other hand, in a third exemplary embodiment, an example in which reception-transfer setting is inhibited will be described. Similar components to those in the first exemplary embodiment are assigned common reference numerals.

FIG. 18 illustrates an example of an operation screen displayed on an operation unit 219.

The operation screen illustrated in FIG. 18 is displayed when transfer setting is performed. Information 1801 indicates a receiving method of image data which should be transferred. An MFP 101 can receive the image data using a facsimile or an Internet facsimile, and can select a desired receiving method from options displayed in a drop down format.

Information 1802 indicates a receiving condition to determine whether the image data should be transferred. When the facsimile is selected in the information 1801, a condition "transmission source number is 03-1234-5678", for example, can be set in the information 1802. In this case, if image data is received from an apparatus with a facsimile number 03-1234-5678, the image data is transferred. If the Internet facsimile is selected in the information 1801, a condition "transmission source address is abc@bbb.co.jp", for example, can be set.

Information 1803 indicates a transfer destination of image data. When a user touches an entry field of the information 1803, a transfer destination input screen illustrated in FIG. 19 is displayed. A case where received image data is transferred by file transmission will be described by way of example. Contents previously displayed (preset) on the screen illustrated in FIG. 19 are switched depending on setting of continuous use of authentication information.

If the operation key 901 is operated on the operation screen illustrated in FIG. 9, information 1903 and information 1904 are displayed while being left blank. In this case, the user needs to input the information 1903 and 1904.

If the operation key 902 is operated on the operation screen illustrated in FIG. 9, the operation screen illustrated in FIG. 19 is displayed while the authentication information received in step S1101 (the authentication information stored in step S1104) is read out, and is preset as the information 1903 and the information 1904, respectively.

The authentication information, which has been input by the user to login to the MFP 101, is preset on the operation screen illustrated in FIG. 19 so that time and labor required for the user to input the same authentication information many times can be saved.

If the operation key 903 is operated on the operation screen illustrated in FIG. 9, and the information 1001 and the information 1002 illustrated in FIG. 10 are registered, the operation screen illustrated in FIG. 19 is displayed while the information 1001 and the information 1002 are respectively preset as the information 1903 and the information 1904.

If the information 1001 and the information 1002 illustrated in FIG. 10 are not registered, the operation screen illustrated in FIG. 19 is displayed while a user name in the authentication information received in step S1101 (the authentication information stored in step S1104) is preset as the information 1903. At this time, the information 1904 is left blank, or the information 1903 may also be left blank as well as the information 1904.

The user inputs the information 1901 to 1904, or changes a preset content, to complete the reception-transfer setting.

FIG. 20 is a flowchart illustrating an operation for transferring received image data. Each of operations (steps) illustrated in the flowchart of FIG. 20 is implemented when a CPU 211 in the MFP 101 executes a control program stored in a HDD 214.

In step S2001, the CPU 211 receives image data. In step S2002, the CPU 211 extracts one transfer setting. In step S2003, the CPU 211 refers to the information 1802 about the extracted transfer setting, to determine whether the receiving in step S2001 matches a condition set in the information 1802.

If the receiving in step S2001 matches the condition set in the information 1802 (YES in step S2003), the processing proceeds to step S2004. Otherwise (NO in step S2003), the processing proceeds to step S2005.

In step S2004, the CPU 211 transfers the image data, which has been received in step S2001, by file transmission. As specific processing for the file transmission, the MFP 101 is connected to the file server 103 corresponding to a host name indicated by the information 1901, to causes the user to login to the file server 103 (access a folder) using the authentication information set as the information 1903 and 1904.

When the user has successfully logged in to the file server 103, the CPU 211 sends the image data to the file server 103 (stores the image data in a folder indicated by the information 1902).

In step S2005, the CPU 211 determines whether there are any other settings. If there are any other settings (YES in step S2005), the processing returns to step S2002. Otherwise (NO in step S2005), the processing ends.

FIG. 21 is a flowchart illustrating an operation for inhibiting reception-transfer setting in the MFP 101. The reception-transfer setting starts when an operation for displaying the screen illustrated in FIG. 18 is performed. Each of operations (steps) illustrated in the flowchart of FIG. 21 is implemented when the CPU 211 in the MFP 101 executes the control program stored in the HDD 214.

In step S2101, the CPU 211 determines a setting content about continuous use of authentication information. If the operation key 901 or 903 is operated on the operation screen illustrated in FIG. 9 (i.e., "standard" or "register for each user" is selected), the processing proceeds to step S2102. In step S2102, the CPU 211 displays the operation screen illustrated in FIG. 18, and receives input of the transfer setting from the user. In step S2103, the CPU 211 stores the transfer setting in the ROM 212 or the HDD 214.

On the other hand, if the operation key 902 is operated on the operation screen illustrated in FIG. 9 (i.e., if "use authentication information for login to apparatus main body continuously" is selected) as a result of the determination in step S2101, the processing proceeds to step S2104. In step S2104, the CPU 211 displays an error screen including a message stating that reception-transfer setting is inhibited.

If "use authentication information for login to apparatus main body continuously" is selected, the reception-transfer setting is uniformly inhibited. However, another manner may be used. For example, even if "use authentication information for login to apparatus main body continuously" is selected, the reception-transfer setting may not be inhibited if a transfer destination is not that of file transmission.

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-115757 filed May 21, 2012, which is hereby incorporated by reference herein in its entirety.

What is claimed is:

1. An image processing apparatus, comprising:
a first unit configured to execute a first function for transmitting image data using authentication information which has been used for login of a user to the image processing apparatus; and
a second unit configured to execute a second function for receiving time information and transmitting image data based on the received time information,
wherein combination of the first function and the second function is unavailable,
wherein at least one of the first unit and the second unit is implemented by a processor and a memory.

2. The image processing apparatus according to claim 1, further comprising
a third unit configured to execute a third function for transmitting image data without using authentication information which has been used for login of a user to the image processing apparatus.

3. The image processing apparatus according to claim 1, further comprising
a display unit configured to display a screen for receiving the time information from a user.

4. The image processing apparatus according to claim 3, wherein the display unit displays, based on an instruction for displaying the screen, the screen for receiving the time information from the user in a case where the first function is not set to be executed, and displays, based on the instruction, an error in a case where the first function is set to be executed.

5. The image processing apparatus according to claim 1, further comprising a storage unit configured to store the authentication information which has been used for the login of the user to the image processing apparatus,
wherein, in the first process, the authentication information stored in the storage unit is preset in a destination setting screen for setting a destination of the image data.

6. The image processing apparatus according to claim 1, further comprising a scanning unit configured to scan a document,
wherein, in the first function, the image data of the document scanned by the scanner unit is transmitted, and
wherein, in the second function, the image data of the document scanned by the scanner unit is transmitted.

7. The image processing apparatus according to claim 1, wherein the authentication information is user ID.

8. The image processing apparatus according to claim 1, wherein the authentication information is a password.

9. The image processing apparatus according to claim 1, wherein the second function becomes unavailable when the first function is set to be executed.

10. A control method for controlling an image processing apparatus, comprising:
executing, by a processor of the image processing apparatus, a first function for transmitting image data using authentication information which has been used for login of a user to the image processing apparatus; and
executing, by a processor of the image processing apparatus, a second function for receiving time information and transmitting image data based on the received time information,
wherein combination of the first function and the second function is unavailable.

11. A non-transitory computer readable storage medium for storing a computer executable instructions for causing a computer to execute a control method for controlling an image processing apparatus, the control method comprising:
executing, by a processor of the image processing apparatus, a first function for transmitting image data using authentication information which has been used for login of a user to the image processing apparatus; and
executing, by a processor of the image processing apparatus, a second function for receiving time information and transmitting image data based on the received time information,
wherein combination of the first function and the second function is unavailable.

12. An image processing apparatus, comprising:
a setting unit configured to set whether to enable a first function for transmitting image data using authentication information which has been used for login of a user to the image processing apparatus; and an executing unit configured to execute a second function for receiving time information and transmitting image data based on the received time information, wherein the executing unit cannot execute the second function in a case where the setting unit sets to enable the first function, and wherein at least one of the setting unit and the executing unit is implemented by a processor and a memory.

13. The image processing apparatus according to claim 12, further comprising a display unit configured to display a screen for receiving the time information from a user.

14. The image processing apparatus according to claim 13, wherein the display unit displays, based on an instruction for displaying the screen, the screen for receiving the time information from the user in a case where the setting unit sets not to enable the first function, and displays, based on the instruction, an error in a case where the setting unit sets to enable the first function.

15. The image processing apparatus according to claim 12, further comprising a scanning unit configured to scan a document, wherein the image data is image data of the document scanned by the scanner unit.

16. The image processing apparatus according to claim 12, wherein the authentication information is user ID.

17. The image processing apparatus according to claim 12, wherein the authentication information is a password.

* * * * *